(12) United States Patent
Aleryd et al.

(10) Patent No.: US 10,996,411 B2
(45) Date of Patent: May 4, 2021

(54) OPTOELECTRONIC ASSEMBLY

(71) Applicant: OPTOSKAND AB, Mölndal (SE)

(72) Inventors: Simon Aleryd, Skårtorp (SE); Stuart Campbell, Mölndal (SE); Olof Sallhammar, Nödinge (SE)

(73) Assignee: OPTOSKAND AB, Mölndal (SE)

( * ) Notice: Subject to any disclaimer, the term of this patent is extended or adjusted under 35 U.S.C. 154(b) by 0 days.

(21) Appl. No.: 16/649,060

(22) PCT Filed: Oct. 12, 2018

(86) PCT No.: PCT/EP2018/077925
§ 371 (c)(1),
(2) Date: Mar. 19, 2020

(87) PCT Pub. No.: WO2019/076766
PCT Pub. Date: Apr. 25, 2019

(65) Prior Publication Data
US 2020/0292758 A1     Sep. 17, 2020

(30) Foreign Application Priority Data

Oct. 17, 2017   (SE) .................................. 1751284-9

(51) Int. Cl.
G02B 6/42      (2006.01)
G02B 6/293     (2006.01)
G02B 6/32      (2006.01)

(52) U.S. Cl.
CPC ....... *G02B 6/4269* (2013.01); *G02B 6/29361* (2013.01); *G02B 6/32* (2013.01);
(Continued)

(58) Field of Classification Search
CPC .... G02B 6/29361; G02B 6/32; G02B 6/4215; G02B 6/4269; G02B 5/282;
(Continued)

(56) References Cited

U.S. PATENT DOCUMENTS 5,179,610 A    1/1993  Milburn et al.
7,204,645 B2*  4/2007  Brown ................ G02B 6/3813
                                              385/31
(Continued)

FOREIGN PATENT DOCUMENTS

GB        2361314 A     10/2001

OTHER PUBLICATIONS

International Preliminary Report on Patentability received for PCT Patent Application No. PCT/EP2018/077925, dated Apr. 30, 2020, 7 pages.
(Continued)

*Primary Examiner* — Daniel Petkovsek
(74) *Attorney, Agent, or Firm* — Morrison & Foerster LLP

(57) ABSTRACT

The invention relates to an optical assembly (100) comprising a first optical fiber (101) propagating coherent light in a predetermined direction (P) into an input end (110) of the optical assembly (100), said optical fiber having a core and a cladding; a heat sink (111) surrounding the optical fiber (101) at the input end (110); and a lens (120) arranged after the heat sink (111) in the propagating direction (P). The optical assembly (100) further comprises a filter (130) arranged after the lens (120), wherein the filter (130) has a reflective surface (131) arranged to transmit light having one or more desired wavelengths and to reflect one or more undesired wavelengths back through the lens (120). The invention further relates to a method for separating desired and undesired wavelengths.

20 Claims, 5 Drawing Sheets

(52) U.S. Cl.
CPC .......... *G02B 6/4215* (2013.01); *G02B 6/4296* (2013.01); *G02B 2006/4297* (2013.01)

(58) Field of Classification Search
CPC ........ G02B 2006/4297; G02B 6/02052; G02B 6/293; G02B 6/4292
See application file for complete search history.

(56) References Cited

U.S. PATENT DOCUMENTS

| | | | | |
|---|---|---|---|---|
| 7,400,794 | B1* | 7/2008 | Pang | G02B 6/262 |
| | | | | 385/123 |
| 9,360,643 | B2* | 6/2016 | Rinzler | G02B 6/3813 |
| 10,120,151 | B1* | 11/2018 | Chin | G02B 6/4272 |
| 2012/0085518 | A1 | 4/2012 | Ichkahn et al. | |
| 2017/0214208 | A1 | 7/2017 | Murakami et al. | |
| 2019/0033501 | A1* | 1/2019 | Hill | G01J 1/0488 |

OTHER PUBLICATIONS

International Search Report and Written Opinion received for PCT Patent Application No. PCT/EP2018/077925, dated Jan. 24, 2019, 8 pages.

* cited by examiner

OPTOELECTRONIC ASSEMBLY

CROSS REFERENCE TO RELATED APPLICATIONS

This application is a national stage application under 35 U.S.C. § 371 of International Application No. PCT/EP2018/077925, filed internationally on Oct. 12, 2018, which claims priority to Swedish Application No. 1751284-9 filed Oct. 17, 2017.

TECHNICAL FIELD

The invention relates to a method and means for separating wanted and unwanted wavelengths of light from a laser source in industrial laser applications. The separation of wavelengths is performed in a fiber optical assembly including an optical fiber for transmitting high optical power, specifically power exceeding 1 kW, and wherein optical radiation falling outside the fiber core is absorbed at least partially in a flowing coolant.

BACKGROUND OF THE INVENTION

In optical fiber applications for transmitting high optical power it is desirable to avoid that the optical fiber cables, in particular components such as fiber connectors can be damaged due to incident radiation that is falling outside the core of the fiber, or due to radiation that are reflected back to the fiber connectors. Methods are previously known to take care of such power loss. Specifically, it is previously known to have such incident radiation absorbed in a flowing coolant.

Optical fiber cables for transmitting high optical power are frequently used in industrial applications. Specifically they are used in cutting and welding operations by means of high-power laser radiation, but also in other industrial applications such as heating, detection or working operations in high-temperature environments this type of optical fiber cables can be used. By means of the optical fibers it is possible to build up flexible manufacturing systems for transmitting radiation from the high power laser source to the workpiece. Normally, an optical fiber has a core of glass and a surrounding cladding. The function of the cladding is to keep the optical beam confined to the core. Laser sources which can be used in this context can have an average power output of up to several kilowatts.

There can be unwanted emitted wavelengths of light from a laser source that needs to be filtered. Such light can be excess pump light, unconverted light from nonlinear processes or light from a higher order process.

A typical modern industrial laser is pumped with short wavelength light and emits longer wavelength laser light. In most cases is it only the longer wavelength laser light that is of interest. The shorter wavelength can negatively affect the detection equipment or processes outside the laser. For example; an industrial fiber laser can be pumped with light at a wavelength of ~980 nm and can emit laser light at a wavelength of ~1070 nm.

Short pulse lasers are commonly frequency doubled or tripled. As this process is somewhat inefficient a certain amount of the primary wavelength remains. For example; a nanosecond Nd:YAG (neodymium-doped yttrium aluminium garnet) laser operating at 1064 nm can be frequency doubled to 532 nm using a non-linear crystal.

In cases where light is guided with high intensities, i.e. with high power combined with low volume, light of different wavelengths can be spontaneously generated. For example; a multi-kW single mode laser operating at ~1070 nm can generate so called Raman light at longer wavelengths.

In optical fiber devices such as fiber amplifiers for intense pulses, Raman scattering can be detrimental: it can transfer much of the pulse energy into a wavelength range where laser amplification does not occur. This effect can limit the peak power achievable with such devices. Even in continuous-wave high-power fiber lasers and amplifiers, Raman scattering can be a problem. There are, however, various kinds of solutions to such problems, including chirped-pulse amplification and the use of special fiber designs which suppress Raman scattering by attenuating the Raman-shifted wavelength component.

Another method for separating light of different wavelengths is to use a dichroic mirror as a filter. A dichroic mirror can reflect a specific wavelength or specific wavelengths and while a desired wavelength or wavelengths are transmitted through the dichroic mirror. The angle of reflection for the dichroic mirror is specified during the design of the mirror along with the wavelengths to transmit/reflect. The mirror is a multi-layer dielectric coating deposited on a suitable substrate, preferably a glass substrate such as fused silica or fused quartz. Alternating layers of optical coatings with different refractive indices are built up upon the substrate using, for instance, vacuum deposition. The interfaces between the layers of different refractive index produce phased reflections, selectively reinforcing certain wavelengths of light and interfering with other wavelengths. By controlling the thickness and number of the layers, the frequency (wavelength) of the passband of the filter can be tuned and made as wide or narrow as desired. There are physical limits to how close the transmitted and reflected wavelengths can be to each other. Also, depending on which wavelengths are of interest, there are limits to which angle the light can be reflected. Known methods involve positioning a dichroic mirror at 45° to the optical axis of the incident light. Because unwanted wavelengths are reflected rather than absorbed, dichroic filters do not absorb the unwanted energy during operation and will not heat up to the same extent as equivalent conventional filters.

A problem with tilting a filter at such a large angle is that the reflected light is directed out of a fiber connector or a similar device and into an additional cooler or absorber. This solution adds both cost and complexity. Also it is difficult, if not impossible, to design a filter with this relatively high angle of incidence given that the wanted and unwanted wavelengths are often close to each other. Hence, further problems with this solution relate to reduced efficiency of the filter and inability to separate wavelengths unless the wanted and unwanted wavelengths are sufficiently far removed from each other.

The object of the invention is to provide an improved way of separating light of different wavelengths that will overcome the above problems.

INVENTION

The above problems have been solved by an optoelectronic device and a method as claimed in the appended claims.

In the subsequent text, the term "optical fiber" is intended to describe an optical fiber comprising at least a core and a cladding. An optical fiber typically has an inner quartz-glass core and a transparent, surrounding layer, a so-called cladding, having a lower refractive index than the core. The function of the cladding is to keep the optical beam confined to the core. The core and cladding can be covered by protective buffer and jacket layers. As an example, an optical fiber can comprise an inner core made of, for instance, quartz-glass, for propagating radiation. The surrounding cladding can be made of, for example, glass or a polymer having a suitable refractive index. The cladding can comprise one or more layers and the object of the cladding is to optically "lock" the radiation into the core. Outside the cladding there are one or more protecting jackets to make the optical fiber more mechanically stable. These layers are often termed "buffer" or "jacket" layers and can comprise, for instance, a polymer layer such as polyurethane or PVC.

The term "propagating direction" is used to indicate the direction in which the light is transmitted through the optical assembly from the source to an industrial process. Light transmitted in the propagating direction will be termed "incident light". Light transmitted in the opposite direction will be termed "reflected light" and may be generated by an industrial process such as laser welding or cutting.

As opposed to the relatively low powered fiber optic systems used for communications applications (<1 W), a "high power" application as referred to in this text is commonly used for industrial applications. The fiber optical assemblies described in this context are designed to handle high power, from one kilowatt (kW) to 20 kW or more of continuous-wave output power. For high power applications, the power at unwanted wavelengths can be so high that active cooling of the assembly is needed to absorb it in order to avoid component damage.

According to a preferred embodiment, the invention relates to an optical assembly comprising a first optical fiber propagating light in a predetermined direction into an input end of the optical assembly. A second optical fiber is arranged for propagating coherent light out of an output end of the assembly. The optical fiber comprises at least a core and a cladding. The optical assembly further comprises a heat sink surrounding the optical fiber at the input end of the assembly, a lens arranged after the heat sink in the propagating direction and a re-focusing lens after the lens in the propagating direction. The lens is preferably, but not necessarily, a collimating lens. According to the invention, the optical assembly further comprises a filter arranged between the lens and the re-focusing lens. The filter has a reflective surface arranged to transmit light having one or more desired wavelengths and to reflect one or more undesired wavelengths. The undesired wavelengths are reflected back to the lens, which re-focuses the reflected light towards the heat sink.

One way of separating light of different wavelengths is to use a dichroic mirror as a filter. A dichroic mirror is a multi-layer dielectric coating deposited on a suitable substrate. The substrate can comprise fused silica, fused quartz or a similar suitable material. The subsequent examples describe dichroic mirrors which will fully reflect an undesired wavelength or wavelengths while transmitting a desired wavelength or wavelengths. However, it is also possible to design a dichroic mirror with a coating that will only partially reflect a particular wavelength or wavelengths. The angle of reflection is specified during the design of the mirror along with the wavelengths to transmit/reflect for the specific application. Such factors must be considered, as there are physical limits to how close the transmitted and reflected wavelengths can be to each other.

Depending on which wavelengths are of interest, there are limits to which angle the light can be reflected. The invention avoids this problem by selecting a relatively small angle to make full use of the properties of the dichroic mirror. According to one example, the filter can be arranged to filter out Raman light/wavelengths.

The filter is preferably planar and arranged at an angle to a plane at right angles to the primary optical axis. The filter will thus reflect light back to, and through the lens at an angle to the optical axis of the transmitted light. The optical axis of the incident light from the lens will be referred to as a primary optical axis. In order to make full use of the properties of the dichroic mirror a relatively small angle is selected. The angle can be selected depending on factors such as the distance between the lens and the filter, the outer dimensions of the lens or beam diameter of the incident light and/or where it is desired to re-focus the reflected light into the heat sink. The re-focused reflected light is aimed an end cap that will focus the light onto the end of the heat sink outside the fiber core to allow energy to be removed.

In optical assemblies transmitting more one kW of power, fiber connectors are as commonly provided with a cylindrical end cap made of quartz glass. The end cap is larger in diameter than the fiber core and is spliced to the optical fiber. In this way, laser light is normally focused onto the fiber core via the end surface of the quartz cap, where, at the same laser power, the power density is significantly lower. When, for instance, coupling laser power of NA0.1 in a 200 micron fiber, a 10 mm long end cap changes the energy density at the surface by a factor of 100. Similarly, light transmitted through the fiber will diverge as it passes into the optical assembly through the end cap. In the current example, however, the reflected light is re-focused by the lens so that the light passing through the end cap will not reach the fiber core.

Alternatively, the end cap can be optional. In this case the end of the fiber would be free-standing, extending a predetermined distance into the optical assembly in the location where the end cap would normally be located. Behind this location the fiber can be held in a mechanical part, such as a V-block or a radial clamp. Alternatively the fiber can be glued into position in a drilled channel through the end of the heat exchanger.

According to this example, the filter can be arranged to filter out Raman light even if the wavelengths are relatively close together, e.g. less than 100 nm separation. The lens and filter can also be arranged to re-focus the reflected light to one side of the fiber, outside the core of the first optical fiber. The lens is thereby arranged to re-focus the reflected light into the cladding of the first optical fiber or into the cladding and directly onto the end of the heat sink. This allows an even smaller angle to be selected. In the heat sink the energy from the reflected light can be absorbed and removed from the optical assembly. Similarly, heat generated by light directed into the cladding can also be absorbed by the heat sink. In order to avoid a hot spot from forming due to constant exposure to the re-focused reflected light, the filter can alternatively be mounted in a rotatable holder. By rotating the filter at a constant or variable speed, the energy from the reflected light can be distributed over a larger area of the heat sink and provide a more even temperature distribution. The reflective surface of the filter can be a planar circular surface arranged at a selected angle to a plane at right angles to the primary optical axis of the incident light from the lens. In this case the dimensions of the lens must be selected sufficiently large to avoid any portion of the reflected light from passing outside the lens.

Alternatively, the filter is non-planar and arranged to reflect light back to, and through the lens along a secondary optical axis at an angle to the primary optical axis of the transmitted light. The reflected light will follow the secondary optical axis and be re-focused by the lens. The angle can be selected depending on factors such as the distance between the lens and the filter, the outer dimensions of the lens and/or where it is desired to re-focus the reflected light into the heat sink. In this example, the reflective surface of the filter can be a circular concave or convex surface with a secondary optical axis arranged at a selected angle to the optical axis of the incident light from the lens at the input end of the assembly. The radius of the concave or convex surface is selected to ensure that no portion of the reflected light passes outside the lens, or strikes its supporting structure. The radius of such a non-planar surface should be relatively large, preferably well over 10 m, in order to ensure that only the desired wavelengths are reflected. The center point of the radius will be located on this secondary optical axis. As the reflective surface is concave, the reflected light will be re-focused within the end cap immediately in front of end surface of heat sink. In this case, the end cap is in direct contact with the coolant within the heat sink, so that any heat generated within the end cap can be effectively removed by the flowing coolant. As indicated above, the filter can also be rotated to provide a more even temperature distribution.

According to one example, the heat sink can be an active, fluid cooled heat exchanger supplied with a suitable flowing coolant medium. This arrangement provides an effective cooling of the optical assembly when absorbing the one or more undesired wavelengths.

According to a first example, the heat sink is a gas cooled heat exchanger. According to a second example, the heat sink is a liquid cooled heat exchanger. The liquid can be water or a similar suitable liquid.

The optical assembly can be provided with a transparent end cap adjacent its input end. According to a preferred example, the first optical fiber is terminated in optical contact with the transparent end cap, which end cap is located adjacent the heat sink after the heat sink in the propagation direction. The end cap can be mounted adjacent the heat sink, either with a suitable spacing or connected, directly or indirectly, to the heat sink. The end cap can be made from glass, comprising quartz or silica, or from a similar suitable transparent material.

The invention also relates to a method for separating wavelengths of light in an optical assembly. An indicated above, the optical assembly comprises a first optical fiber propagating light in a predetermined direction into an input end of the assembly and a second optical fiber propagating light out of an output end of the optical assembly, said optical fiber having a core and a cladding. A heat sink is arranged surrounding the optical fiber at the input end of the assembly. The optical assembly further comprises a lens arranged after the heat sink in the propagating direction and a re-focusing lens after the lens in the propagating direction. The method involves performing the steps of:
- transmitting light from a source of laser light into the optical assembly;
- transmitting light having one or more desired wavelengths through the lens through a filter arranged between the lens and the re-focusing lens;
- reflecting light having one or more undesired wavelength back through the lens from the filter, which filter has a reflective surface.

According to the method, the lens is used to re-focus the reflected light to one side of the fiber, outside the core of the first optical fiber at the input end of the assembly. In particular, the lens can re-focus the reflected light into the heat sink or to the cladding of the first optical fiber.

As indicated above, the heat sink can be a, active, fluid cooled heat exchanger supplied with a suitable flowing coolant medium. The optical assembly can be provided with a transparent end cap adjacent its input end, which end cap is located adjacent the heat sink after the heat sink in the propagation direction.

An advantage of the inventive device is that the filter is only tilted over a very small angle so that the reflected light is directed back to the lens. In this way the reflected light can be re-focused and directed back into the cooler at the input end of the optical assembly. This eliminates the need for an additional cooler or absorber to one side of the optical assembly and reduces both cost and complexity. In addition, the small angle of incidence makes it possible to separate the wanted and unwanted wavelengths even if they are relatively close to each other. Consequently, the inventive device improves both the efficiency of the filter and its ability to separate wavelengths. The optical assembly can form part of multiple different devices, such as optical fiber connectors and process heads for welding or cutting.

FIGURES

In the following text, the invention will be described in detail with reference to the attached drawings. These schematic drawings are used for illustration only and do not in any way limit the scope of the invention. In the drawings.

DETAILED DESCRIPTION

Figure 1:
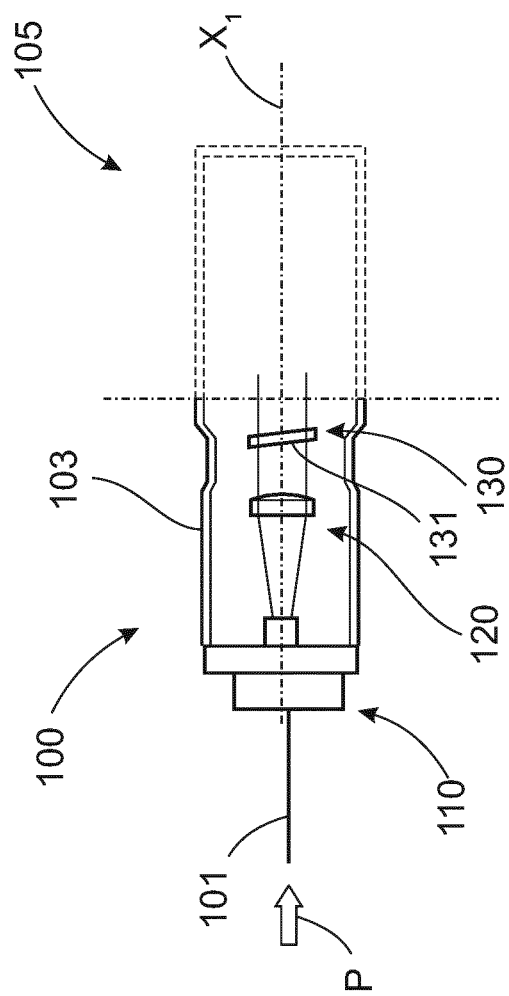
FIG. 1 shows a schematic optical assembly according to the invention.

FIG. 1 shows a schematic cross-section of an optical assembly 100 according to the invention. The optical assembly 100 comprises a first optical fiber 101 propagating light from a laser source (not shown) in a predetermined propagating direction P into an input end 110 of the assembly 100. The optical fiber 101 comprises at least a core and a cladding layer.

The optical assembly 100 further comprises a housing 103 enclosing a lens 120 arranged after the input end 110 in the propagating direction P. The lens used for this purpose is preferably, but not necessarily, a collimating lens. A filter 130 is arranged after the lens 120 in the propagating direction, which filter 130 has a reflective surface 131 arranged to transmit light comprising one or more desired wavelengths and to reflect one or more undesired wavelengths. The optical assembly 100 can be attached to and form part of a device 105 (indicated in dashed lines) which device can be, for instance, an optical fiber connector or a process head for cutting or welding. Within the scope of the invention, the optical assembly can be a fiber-fiber coupler.

Figure 2:
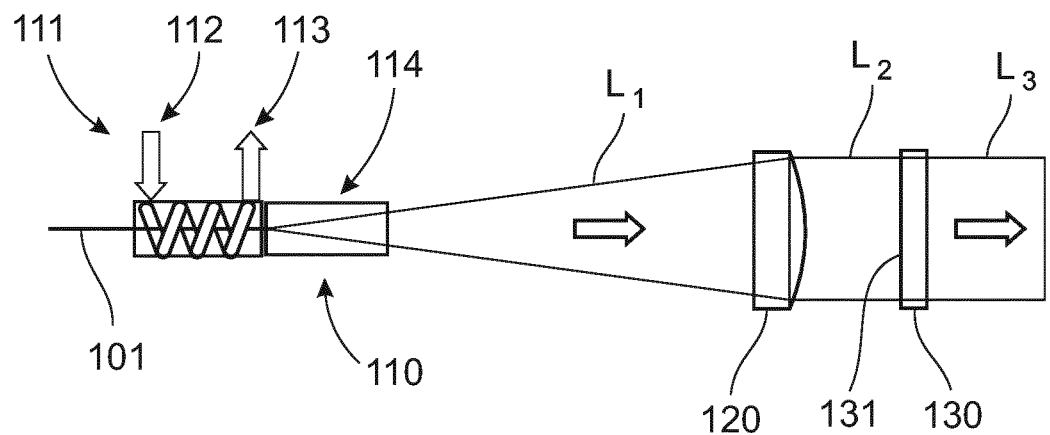
FIG. 2 shows an enlarged side view of the input end of the optical assembly in FIG. 1.

FIG. 2 shows an enlarged side view of the input end of the optical assembly 100 in FIG. 1. The input end 110 comprises a heat sink 111 surrounding the first optical fiber 101 and a transparent end cap 114 to which the first optical fiber 101 is optically connected by means of an optical glue or a similar suitable material. The end cap 114 is located adjacent the heat sink after the heat sink in the propagation direction P of the incident light from the light source. According to this example, the end cap is directly connected to the heat sink, but it can also be mounted with a suitable spacing. The heat sink 111 can be a fluid cooled heat exchanger, such as a gas cooled or a liquid cooled heat exchanger. In the current example, the heat sink 111 is a water cooled heat exchanger having a coolant inlet 112 and a coolant outlet 113. The end cap 114 is optional and can be made from glass, comprising quartz or silica, or from a similar suitable transparent material.

As the transmitted light exits the core of the fiber 101 and enters the end cap 114, the beam of light indicated by L1 will diverge until it reaches the lens 120 arranged after the heat sink 111 in the propagating direction. The beam L2 leaving the lens 120 comprises parallel rays propagating with no divergence towards the filter 130. Light having one or more desired wavelengths is transmitted through the filter 130 as a transmitted beam L3 that passes through of the optical assembly towards an industrial process (see FIG. 6).

Figure 3:
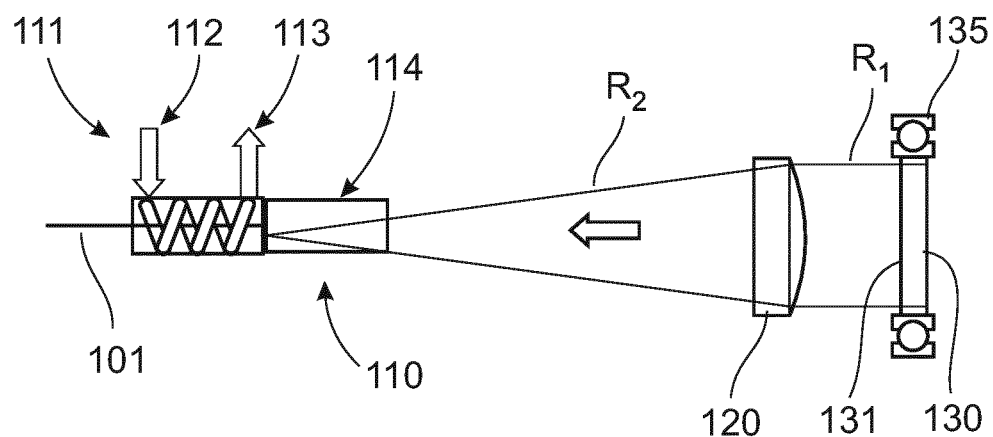
FIG. 3 shows a further side view of the input end of the optical assembly in FIG. 1.

FIG. 3 shows a further side view of the input end of the optical assembly 100 in FIG. 1. The beam L2 leaving the lens 120 comprises one or more undesired wavelengths which are reflected by the filter 130 and is returned to the lens 120 as a reflected beam R1. The lens 120 is used to re-focus the reflected light beam R1 to form a converging, re-focused reflected light beam R2, which is focused to one side of the fiber, outside the core of the first optical fiber 101 through the end cap 114 at the input end 110 of the assembly. As schematically indicated in FIG. 3, the lens 120 is preferably arranged to re-focus the reflected light into the heat sink, but it can also be re-focused at least partially into the cladding of the first optical fiber 101.

Long term, constant exposure to light of relatively high optical power may potentially degrade the cladding and it is preferable to avoid non-symmetric heating. The risk of damaging the cladding can be reduced or eliminated by the provision of a spinning or rotating filter as described below.

In order to avoid a hot spot from forming in the heat sink 111 due to constant exposure to a stationary beam of re-focused reflected light R2, the filter 130 can be mounted in an optional rotatable holder 135. The rotatable holder 135 is arranged to rotate the filter 130 in a plane at right angles to the primary optical axis X1, causing the angled secondary optical axis X2 to follow a conical path about the primary optical axis X1. The focus point of the re-focused reflected light R2 will then follow a circular path about the core of the first optical fiber 101. By rotating the filter 130 at a constant, intermittent or variable speed, the energy from the reflected light R2 can be distributed over a larger area of the heat sink 111 and provide a more even temperature distribution. The rotatable holder 135 can comprise a step motor, a continuously or intermittently driven electric motor, or a similar suitable drive means. The rotatable holder 135 can be provided with a support structure comprising a sliding bearing, a roller/ball bearing, or a similar suitable device.

Figure 4A:
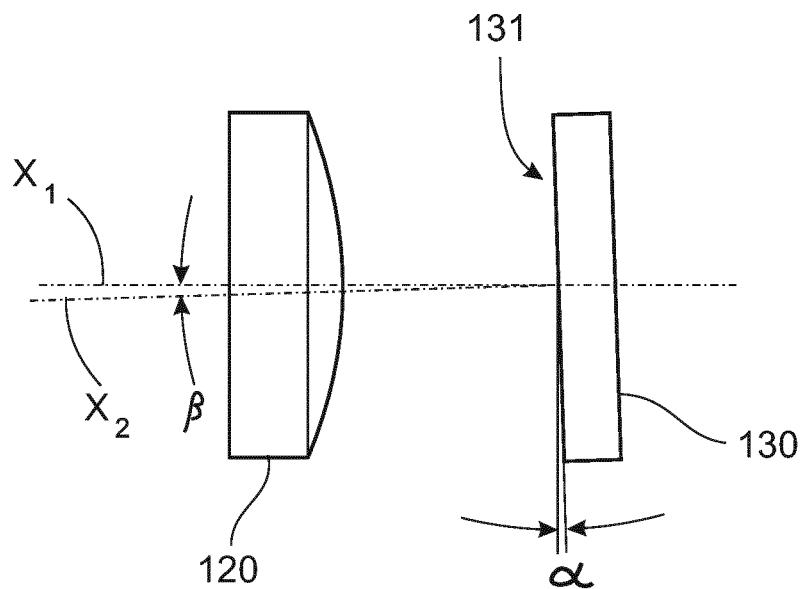
FIG. 4A shows a first example of a reflecting filter according to the invention.

FIG. 4A shows a first example of a reflecting filter according to the invention. The figure shows the lens 120 with a primary optical axis X1, which is the optical axis for both the lens 120 and the incident light beam L2 indicated in FIG. 2. The light will then reach the filter 130, which in this example is a dichroic mirror with flat reflective surface 131. A dichroic mirror comprises a multi-layer dielectric coating deposited on a suitable substrate, such as fused silica or fused quartz. The dichroic mirror 130 will fully reflect a specific wavelength or wavelengths and fully transmit other wavelength or wavelengths. In this example, the dichroic mirror 130 will transmit light at 1070 nm and reflect Raman light at 1120 nm.

The filter 130 is planar and arranged at an angle α to a plane at right angles to the primary optical axis X1. In this way the filter 130 will reflect light back to, and through the lens 120 along a secondary optical axis X2 at an angle β to the primary optical axis X1 of the incident light from the lens, which angle β corresponds to the angle 2 α. The reflected light will follow the secondary optical axis X2 and be re-focused by the lens 120, as described above. In order to make full use of the properties of the dichroic mirror a relatively small angle is selected. The angle α is selected depending on factors such as the distance between the lens 120 and the filter 130, the outer dimensions of the lens 120 and/or where it is desired to re-focus the reflected light into the heat sink. According to this example, the filter can be arranged to filter out Raman light even if the wavelengths are relatively close together (less than 100 nm separation).

In the current example, the reflective surface of the filter 130 is a flat circular surface 131 arranged at a selected angle α to a plane at right angles to the primary optical axis X1 of the incident light from the input end of the assembly. In this case the outer dimensions of the lens 120 must be selected sufficiently large to avoid any portion of the reflected light from passing outside the lens, or from striking its supporting structure (not shown).

Figure 4B:
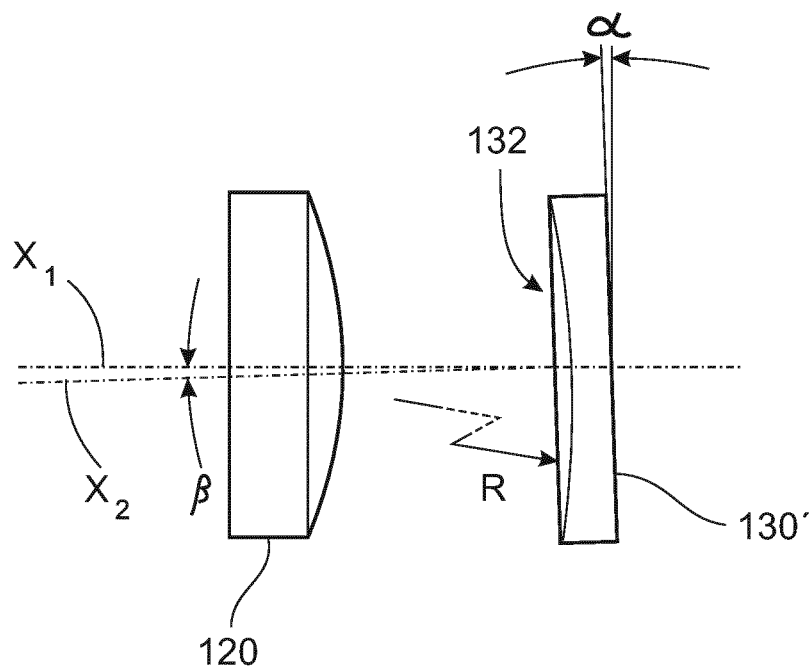
FIG. 4B shows a second example of a reflecting filter according to the invention.

FIG. 4B shows a second example of a reflecting filter according to the invention. The figure shows the lens 120 with a primary optical axis X1, which is the optical axis for both the lens 120 and the transmitted light beam L2 indicated in FIG. 2. The light will then reach the filter 130', which in this example is a dichroic mirror with concave reflective surface 132. The dichroic mirror 130' will fully reflect a specific wavelength or wavelengths and fully transmit other wavelength or wavelengths. In this example, the dichroic mirror 130' will transmit light at 1070 nm and reflect Raman light at 1120 nm.

The filter 130' is arranged at an angle α to a plane at right angles to the primary optical axis X1 to reflect light back to, and through the lens 120 along a secondary optical axis X2 at an angle β to the primary optical axis X1 of the incident light. This can be achieved by either angling the filter 130' as described above for FIG. 4A, or by using a filter with an aspherical surface (not shown). If an aspherical reflective surface is selected, then the filter need not be angled in order to achieve an angled secondary optical axis. The reflected light will follow a secondary optical axis X2 and be re-focused by the lens 120, as described above. In order to make full use of the properties of the dichroic mirror a relatively small angle is selected. The angle β is twice the angle α and can be selected depending on factors such as the distance between the lens 120 and the filter 130 and/or the outer dimensions of the lens 120. According to this example, the filter can be arranged to filter out Raman light even if the wavelengths are relatively close together (less than 100 nm separation).

In this example, the reflective surface 132 of the filter 130' is a circular concave surface 132 with a its optical axis arranged at an angle β to the primary optical axis X1 of the lens and the incident light from the lens at the input end of the assembly. The radius R of the concave surface 132 is selected to ensure that no portion of the reflected light passes outside the lens, or strikes its supporting structure (not shown). The center point of the exaggerated radius R will be located between the first and secondary optical axes X1, X2. As the reflective surface is concave, the reflected light will be re-focused within end cap immediately in front of end surface of heat sink. However, as the end cap is in direct contact with the coolant within the heat sink, any heat generated within the end cap can be effectively removed by the flowing coolant.

Figure 5:
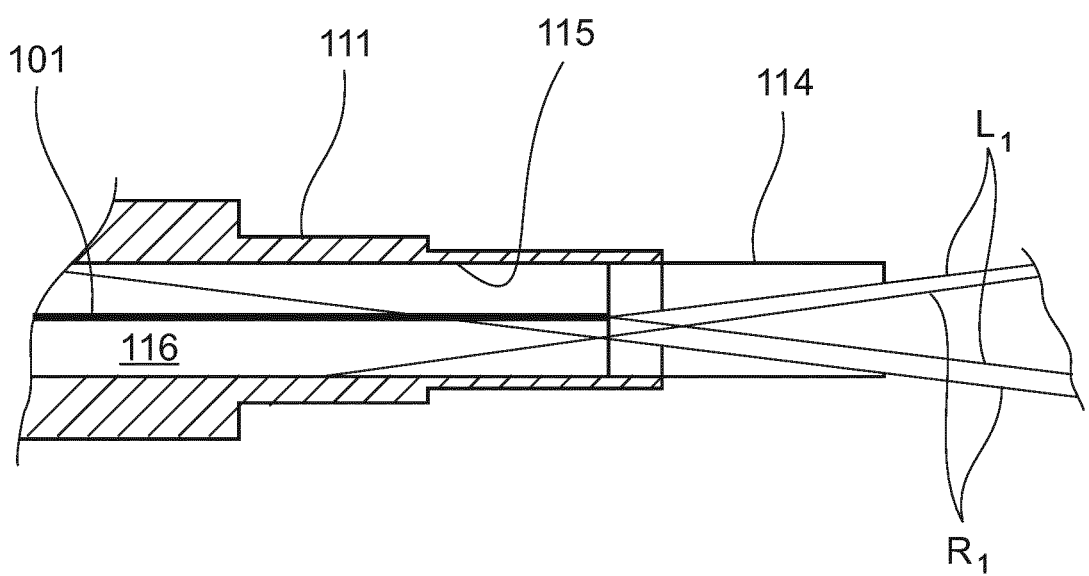
FIG. 5 shows examples of optical paths of transmitted and reflected light in a optical assembly according to the invention.

FIG. 5 shows examples of optical paths for transmitted light L1 and reflected light R2 in an optical assembly according to the invention. FIG. 5 schematically indicates a portion of the heat sink 111 and the end cap 114 illustrated in FIGS. 2 and 3. The heat sink 111 has an inner surface 115 delimiting an internal cavity 116 containing a flowing coolant, as described above. Incident light is transmitted through the first optical fiber 101 through the heat sink 111 towards the end cap 114, to which the first optical fiber 101 is optically connected.

The transmitted light will exit the core of the fiber 101 and enter the end cap 114, where after the beam of light indicated by L1 will diverge until it reaches the lens (see FIG. 2) arranged after the heat sink 111 and the end cap 114 in the propagating direction. After being reflected by the dichroic mirror (see FIG. 3), a beam of reflected light indicated by R1 that has been re-focused by the lens will pass through the end cap 114 and re-enter the heat sink 111. The reflected light will strike the inner surface 115 within the internal cavity. Heat transferred to the inner surface 115 will be absorbed by the coolant and removed from the optical assembly as indicated in FIGS. 2 and 3.

The lens is arranged to re-focus the reflected light R2 to one side of the fiber, outside the core of the first optical fiber 101. The lens is thereby arranged to re-focus the reflected light into the cladding of the first optical fiber or preferably directly into the heat sink 111 where the energy from the reflected light can be absorbed and removed from the optical assembly.

Figure 6:
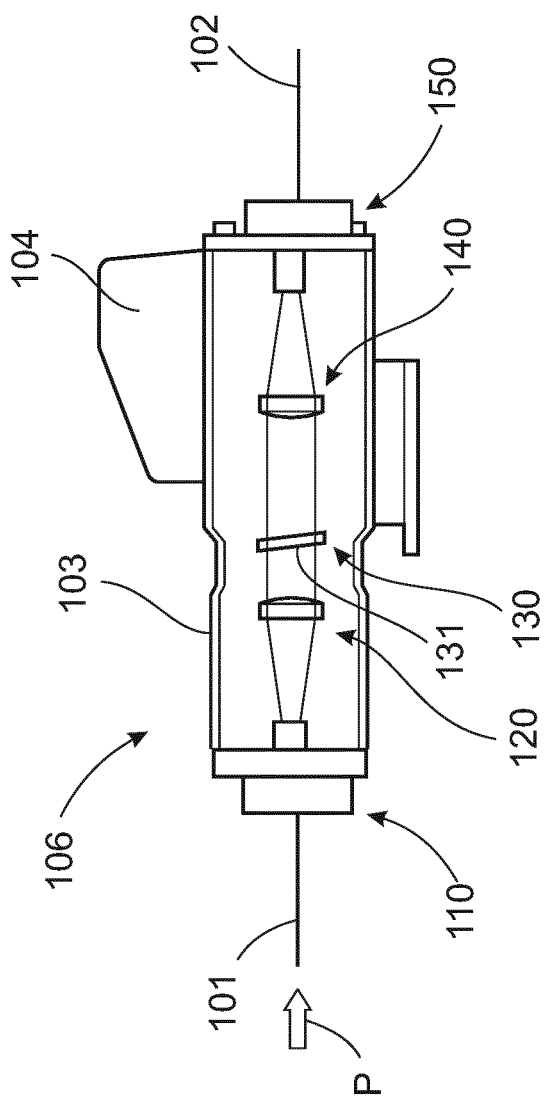
FIG. 6 shows a schematic cross-section of an optical assembly forming part of an optical fiber connector.

FIG. 6 shows a schematic cross-section of an optical assembly forming part of an optical fiber connector 106 according to the invention. The optical fiber connector 106 comprises a first optical fiber 101 propagating coherent light from a laser source (not shown) in a predetermined propagating direction P into an input end 110 of the assembly. A second optical fiber 102 propagates coherent light out of an output end 150 of the fiber connector 106. The optical fiber 101, 102 comprises at least a core and a cladding layer.

The optical fiber connector 106 further comprises a housing 103 enclosing a lens 120 arranged after the input end 110 in the propagating direction P. A re-focusing lens 140 is provided after the lens 120 in the propagating direction P, which re-focusing lens 140 focuses the transmitted, filtered light onto the end of the core of the second optical fiber 102 at the output end 150. A filter 130 arranged between the lens 120 and the re-focusing lens 140, which filter 130 has a reflective surface 131 arranged to transmit light having one or more desired wavelengths and to reflect one or more undesired wavelengths. The optical fiber connector 106 can also be provided with a control unit 104 comprising, for instance, sensor means for monitoring the status of the fiber connector 106 as well as any reflected process light returning through the second optical fiber 102. The reflected process light is not related to the light reflected by the filter 130.

The optical assembly can form part of multiple different devices, such as optical fiber connectors and process heads for welding or cutting. The device can be used with a process head either together with the collimator after the fibre or as a separate component in the process head.

The invention should not be deemed to be limited to the embodiments described above, but rather a number of further variants and modifications are conceivable within the scope of the following patent claims.

The invention claimed is:

1. An optical assembly comprising:
   a first optical fiber propagating light in a predetermined direction into an input end of the optical assembly, said optical fiber having a core and a cladding;
   a heat sink surrounding the optical fiber at the input end and
   a lens having a primary optical axis and arranged after the heat sink in the propagating direction;
   that the optical assembly further comprises a filter arranged after the lens in the propagating direction,
   that the filter has a reflective surface arranged to transmit light having one or more desired wavelengths and to reflect one or more undesired wavelengths back through the lens and wherein the lens is arranged to re-focus the reflected light outside the core of the first optical fiber, such that the energy from the reflected light is absorbed by the heat sink.

2. The optical assembly according to claim 1, wherein the filter is a dichroic mirror.

3. The optical assembly according to claim 1 wherein the filter is arranged to filter out Raman light/wavelengths.

4. The optical assembly according to claim 1 wherein the filter is arranged to reflect light back to the lens at an angle to the primary optical axis of the lens.

5. The optical assembly according to claim 1 wherein the filter is arranged to be rotatable around the primary optical axis.

6. The optical assembly according to claim 1 wherein the filter has a planar reflective surface.

7. The optical assembly according to claim 1 wherein the filter has a non-planar reflective surface.

8. The optical assembly according to claim 1 wherein the lens is arranged to re-focus the reflected light into the heat sink surrounding the first optical fiber.

9. The optical assembly according to claim 1 wherein the lens is arranged to re-focus the reflected light to the cladding of the first optical fiber.

10. The optical assembly according to claim 1 wherein the heat sink is a fluid cooled heat exchanger.

11. The optical assembly according to claim 1, wherein the heat sink is a gas cooled heat exchanger.

12. The optical assembly according to claim 1, wherein the heat sink is a liquid cooled heat exchanger.

13. The optical assembly according to claim 12, wherein the liquid is water.

14. The optical assembly according to claim 1 wherein the optical assembly is a part of a fiber connector.

15. The optical assembly according to claim 1 wherein the optical assembly is attached to a process head.

16. The optical assembly according to claim 1 wherein the optical assembly is a fiber-to-fiber coupler.

17. The optical assembly according to claim 1 wherein the first optical fiber is terminated in contact with a transparent end cap located adjacent the heat sink after the heat sink in the propagating direction.

18. A method for separating wavelengths of light in an optical assembly, the optical assembly comprising:

a first optical fiber propagating light in a predetermined direction into an input end of the optical assembly, said optical fiber having a core and a cladding;

a heat sink surrounding the optical fiber at the input end; and a lens arranged after the heat sink in the propagating direction;

said method comprising the steps of transmitting light from a source of laser light into the optical assembly;

transmitting light having one or more desired wavelengths through the lens through a filter arranged after the lens in the propagating direction;

reflecting light having one or more undesired wavelengths back through the lens from the filter which filter has a reflective surface; and using the lens to re-focus the reflected light outside the core of the first optical fiber at the input end of the assembly such that the energy from the reflected light is absorbed by the heat sink.

19. The method according to claim 18 wherein the lens is used to re-focus the reflected light into the heat sink or to the cladding of the first optical fiber.

20. The method according to claim 18 wherein light is reflected using a dichroic mirror as the filter.

* * * * *